Figure 1:
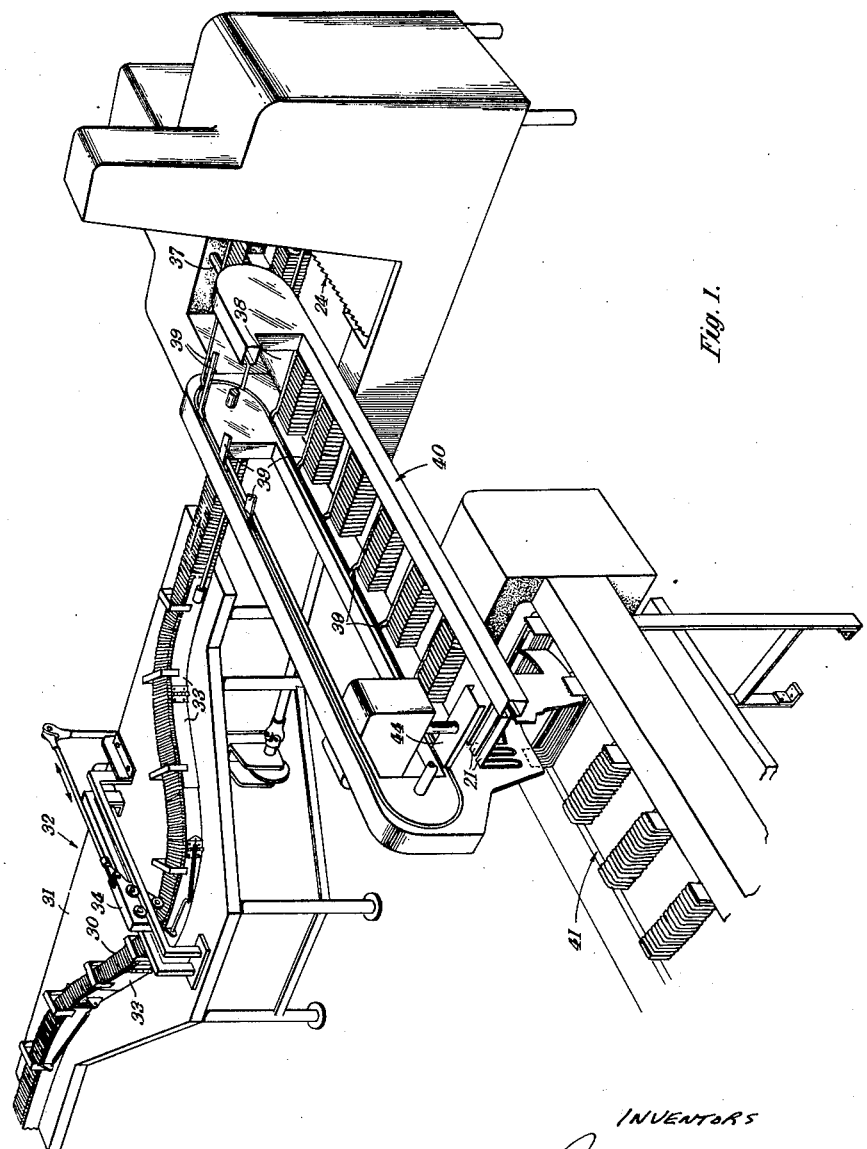

June 5, 1962  D. C. MORTON ETAL  3,037,610
METHOD AND APPARATUS FOR HANDLING BISCUITS AND THE LIKE
Filed Oct. 6, 1959  7 Sheets-Sheet 1

INVENTORS
David Charles Morton and
Percival James Packman

BY Watson, Cole, Grindle & Watson
ATTORNEYS

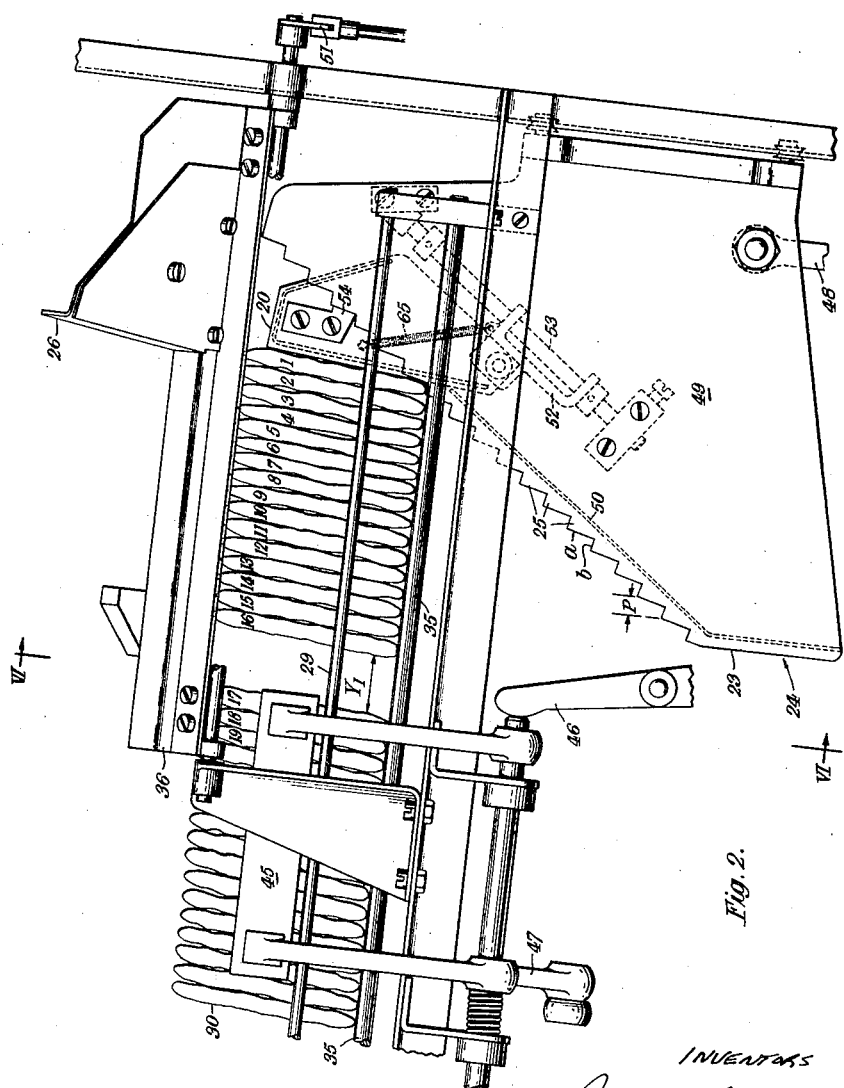

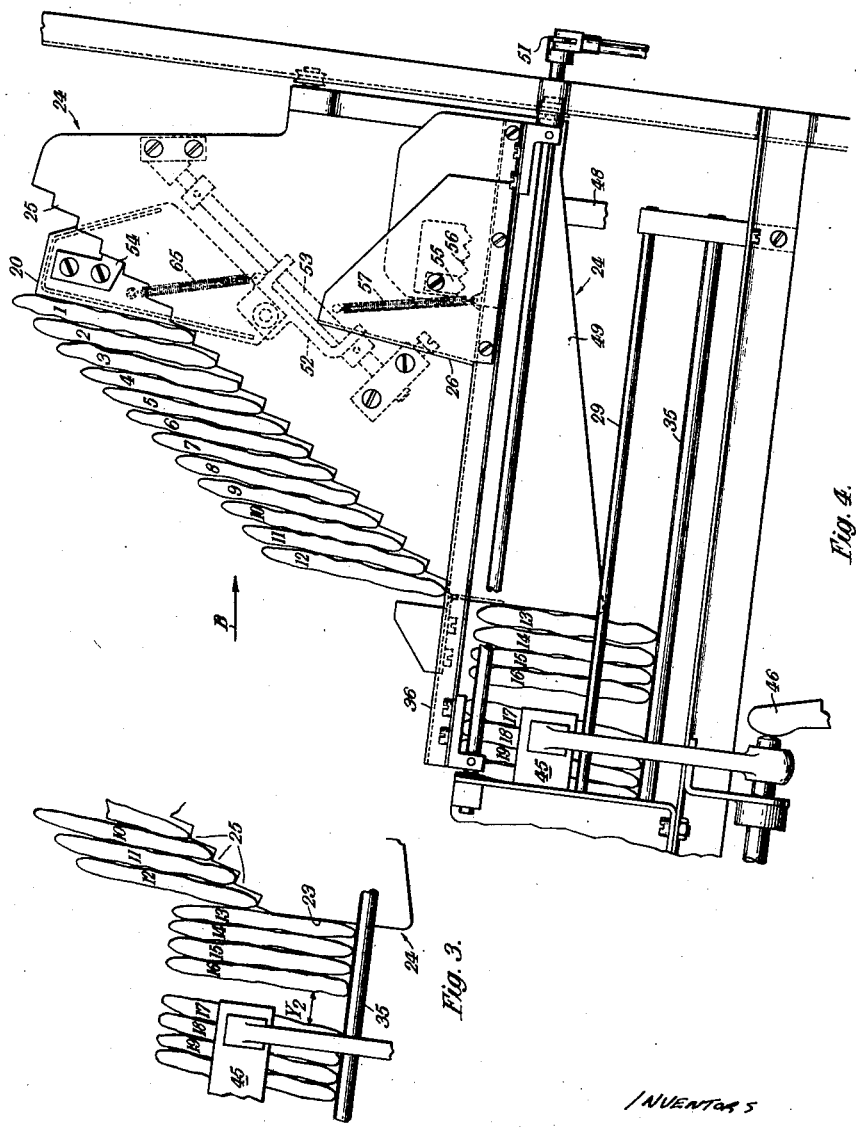

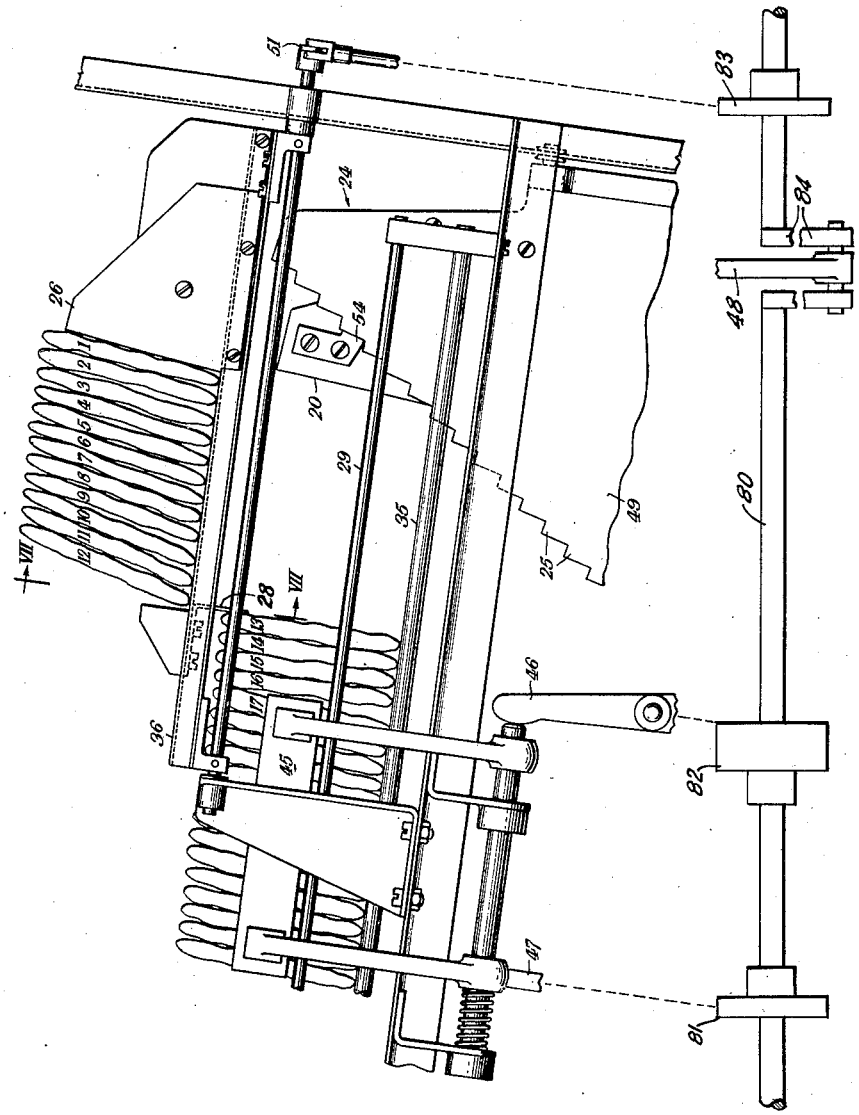

June 5, 1962  D. C. MORTON ETAL  3,037,610
METHOD AND APPARATUS FOR HANDLING BISCUITS AND THE LIKE
Filed Oct. 6, 1959  7 Sheets-Sheet 7

INVENTORS
David Charles Morton
and Percival James Packman
By Watson, Cole, Grindle & Watson
ATTORNEYS United States Patent Office 3,037,610
Patented June 5, 1962

3,037,610
METHOD AND APPARATUS FOR HANDLING BISCUITS AND THE LIKE
David Charles Morton, Woodley, Reading, and Percival James Packman, Twyford, England, assignors to Packman Machinery Limited, Twyford, England, a company of Great Britain
Filed Oct. 6, 1959, Ser. No. 844,688
12 Claims. (Cl. 198—40)

It is known to marshal biscuits, disposed in a number of rows on the cooling conveyor of a biscuit-making machine, into a column of biscuits standing on edge, and to cause the column to travel to a disposal point for further handling, e.g. packaging. The biscuits in the outer rows on the cooling conveyor respond to the baking operation in a slightly different manner to those in the other rows and it is possible by the above procedure to blend the differently cooked biscuits so that when batches are successively taken from the column they will have uniform characteristics.

It is often desired to remove in succession from the head of the column metered batches of biscuits, i.e. batches which comply so far as possible to a given standard, and to pack the batches of biscuits so removed. While individual biscuits generally differ very little in weight, the thickness of some kinds of biscuits is subject to considerable variation. If batching is performed by separating a given length of biscuits from the head of the column, the number of biscuits in the resulting batches may not be uniform with the result that there will be variations in the weight of the batches. Notwithstanding this, many biscuit manufacturers prefer to meter the batches by length as this simplifies the packing operation. Others may prefer to meter the batches by count since then, though the length of the batch may vary, the weight of the batch will not.

Whether metering of the batches is done by length or by count, a difficulty arises in establishing a clear break in the column of biscuits between the last biscuit of the batch to be removed and the first of the following biscuits in the column. This difficulty arises from the fact that the distance from the head of the column of the point at which a separator must enter to separate the rearmost biscuit of a batch from the succeeding biscuits will vary from batch to batch due to the above-mentioned unpredictable variations in thickness of the biscuits, which causes the pitch of the biscuits in the column to vary throughout its length.

The invention provides an apparatus for removing metered batches of biscuits from an advancing column of biscuits standing on edge, comprising a lifting device for lifting batches of biscuits in succession from the head of the column, the lifting device having rack teeth which engage at least the rearmost biscuits of the batch and displace these biscuits rearwardly as they are lifted to increase their pitch to a value in excess of the average pitch of the biscuits in the column, means for withdrawing the lifted batches of biscuits in succession from the lifting device, and mechanism operative prior to lifting of each batch of biscuits to arrest and move bodily backwards biscuits situated in the column to the rear of and near to the batch to be separated.

By so changing the pitch of at least certain of the biscuits at the rear end of each batch it becomes possible to introduce a separator (which may be constituted by the lifting device itself) into the column at a predetermined location between the rearmost displaced biscuit and its successor without fear of it fouling a biscuit or disturbing the biscuits in the batch.

The apparatus may be arranged to batch the biscuits by count, in which case the lifting device has teeth for engaging and repitching all of the biscuits in the batch. Alternatively, it may be arranged to batch the biscuits by length, in which case the lifting device has teeth for engaging and repitching a few biscuits only at the extreme rear of the batch. In either case the tooth for engaging the rearmost biscuit of the batch may have a greater pitch than the others so that the rearmost biscuit is inclined at a greater angle to the vertical than the other biscuits and so acts as a prop for the other biscuits. If desired the apparatus may have interchangeable lifting devices so that it can be adjusted at will to batch the biscuits by count or by length.

Preferably the lifting device is constituted by a reciprocating transfer rack and the withdrawing means comprises a movable support for receiving the batches of biscuits from the transfer rack as it performs its downward stroke, means for moving the support into and out of receiving position in timed relationship with the movement of the lifting member and a means for removing the batches of biscuits in succession from the support. As an alternative, however, a number of transfer racks may be provided which are attached to chains and execute a cyclic movement, the transfer racks operating in succession on the column of biscuits to lift batches of biscuits therefrom.

Figure 6:
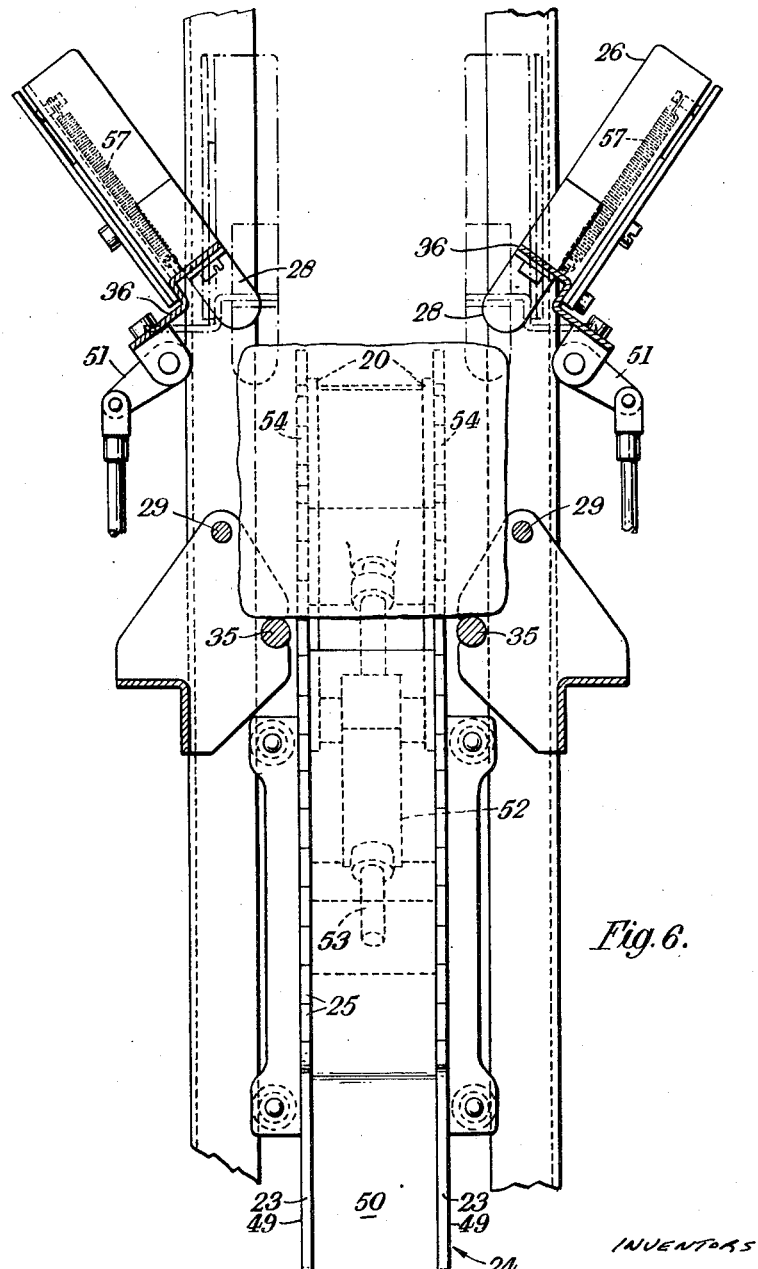
Figure 7:
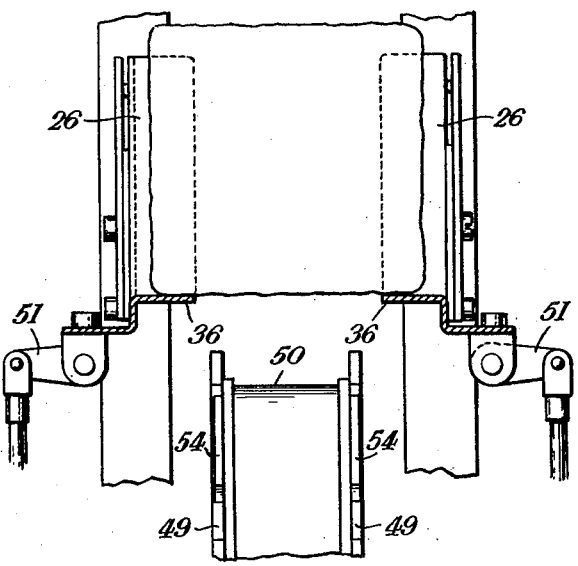
Figure 8:
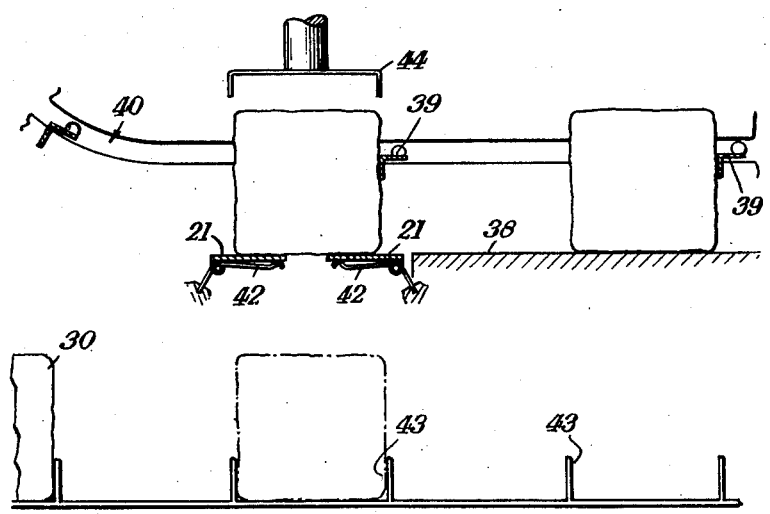
Figure 9:
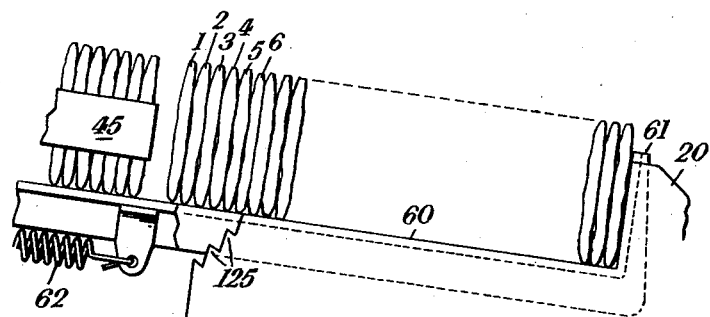
Figure 11:
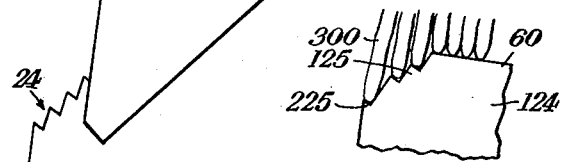
Figure 10:
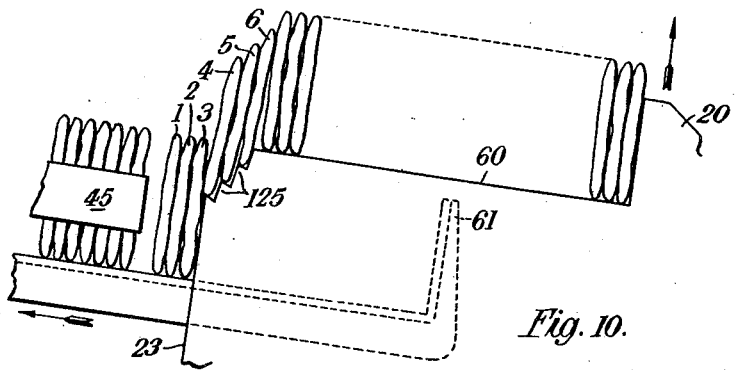

Two alternative embodiments of apparatus according to the invention for batching biscuits will now be described in more detail, by way of example, with reference to the accompanying drawings, in which:

FIG. 1 is a perspective view of the first form of apparatus which batches by count, FIGS. 2–5 are side elevations of the transfer rack, and associated mechanisms, showing the transfer rack in successive positions, FIG. 6 is a section on the line VI—VI in FIG. 2, FIG. 7 is a section on the line VII—VII in FIG. 5, FIG. 8 is an enlarged sectional view of a detail of FIG. 1, FIGS. 9 and 10 are diagrammatic side elevations of an alternative form of transfer rack designed to batch by length and they show the transfer rack in successive positions, and FIG. 11 is a detail view showing a slightly modified construction of transfer rack.

Like reference numerals designate like parts throughout the figures.

Referring first to FIG. 1, it will be seen that a column of biscuits 30 standing on edge is fed by a continuously moving infeed conveyor (not shown) on to a dead plate 31 on which is mounted a biscuit pump 32 of the construction described in U.S. Patent No. 2,976,979. The biscuit pump is constituted by an expansible track 33 linked to a reciprocating carriage 34, the track periodically expanding to receive biscuits from the supply and then contracting to feed the biscuits forward on to a fixed track constituted by side guides 29 and a bottom support rail 35 (FIG. 2). A reciprocating transfer rack 24 operates periodically, as later described, to lift counted batches of biscuits from a transfer station on the fixed track and deposit them on stripper rails 36 (FIG. 7). The batches of biscuits are transferred in succession from the rails 36 by a reciprocating plunger 37 (FIG. 1) to a table 38 along which they are carried forward by the flights 39 of an intermittently moving conveyor 40. Beneath the table 38 is the intermittently moving pocketed infeed conveyor 41 of a packing machine. Each batch of biscuits is fed in turn by the flights 39 on to a pair of flaps 21, which are normally maintained by springs 42 (FIG. 8) in a horizontal position. As each pocket 43 of the conveyor 41 dwells beneath the flaps 21, a domed plunger 44 descends to transfer a batch of biscuits downwardly into the pocket 43, the flaps being depressed to a vertical position and serving to guide the biscuits into the pocket.

Turning now to FIGS. 2–7 it will be seen that the column of biscuits is fed in a slightly downward direction along the fixed track 29, 35 into contact with a stop plate 20 mounted on the upper end of the transfer rack 24. In the case illustrated, the apparatus is capable of separating batches containing up to fifteen biscuits from the column, but it can be adapted by the use of a longer transfer rack to handle batches containing a considerably larger number of biscuits. The apparatus is adjustable to vary the number of biscuits in each batch and is illustrated as arranged to deal with batches containing twelve biscuits.

When the leading biscuit has been moved, by the pressure of biscuits behind it, into contact with the stop 20, grippers 45 are moved inwardly to engage the biscuits in rear of the batch to be separated. In the case illustrated the grippers 45 engage the 17th biscuit and a number of biscuits to the rear of it. The grippers 45 then move the 17th biscuit and the biscuits behind it rearwardly, to establish a gap $Y_1$ between the 17th and 16th biscuits. The reciprocatory and rotary movements are imparted to the grippers 45 by a cam-operated tappet 46 and by a cam-operated lever 47 respectively.

After the grippers 45 have moved the biscuits rearwardly, as just described, the transfer rack 24 begins to move upwardly, receiving its reciprocating movement from the crank-operated lever 48. The transfer rack consists of a pair of spaced plates 49, joined by a stiffening web 50 and each formed at the top with a series of rack teeth 25 situated above the web 50. The two series of teeth are situated at the same level and their pitch P is constant and somewhat greater than the average pitch of the biscuits in the procession. The faces $a$ of all the teeth are at the same inclination and extend somewhat forwardly from the vertical. The width of the faces $b$ of the teeth, which constitute steps for supporting the biscuits, is less than the thickness of the biscuits and the inclination of these faces changes from top to bottom of the transfer rack as shown.

As the transfer rack 24 rises, it lifts the biscuits successively off the fixed track, commencing with the first biscuit in the column. As each biscuit is so lifted it is shunted rearwardly, and the twelve biscuits constituting the batch thus all move rearwardly to a new and larger pitch P, the action being indicated in FIGS. 3 and 4. As the transfer rack 24 rises, its toe 23 exerts a stripping action, as shown in FIG. 3, and provides a support for the group of biscuits (Nos. 13–16) between the batch being separated and the biscuits arrested by the grippers 45, this group of biscuits being shunted rearwardly to reduce the gap from the dimension $Y_1$ (FIG. 2) to the dimension $Y_2$ (FIG. 3).

Since the faces $a$ of the rack teeth are nearly vertical, each biscuit can easily slide down the face $a$ of the tooth which picks it up and come to rest on the step $b$, so thrusting rearwardly the biscuit behind it. The biscuits are thus stripped as they are raised by the ascending rack 24. They may be supported by a blast of air travelling in the direction of the arrow B when in the raised position.

After the last biscuit has been raised above the level of the rails 36, these rails are moved inwards by cam-operated levers 51, from the position of FIG. 6 to that of FIG. 7, in which they are located beneath the lifted batch of biscuits, and at the same time stops 28 on the rails are moved into position to support the biscuits immediately behind the lifted batch. The transfer rack 24 is then lowered to deposit the lifted batch of biscuits on the rails 36, from which they are removed as already described. Each rail 36 carries an end stop 26 for supporting the biscuits delivered on to the rails.

After the batch of biscuits has been removed from the rails 36, the rails return to their inoperative position removing the stops 28, the grippers 45 are released and reciprocate back to their initial position, and the column of biscuits moves on until it is arrested by the stop 20, a movable support (not shown) preventing the biscuits from falling over during their travel to the stop 20. The cycle of operations is then recommenced.

The grippers 45, the transfer rack 24 and the rails 36 are operated in correctly coordinated relationship from a shaft 80 which, as shown diagrammatically in FIG. 5, carries cams 81, 82 and 83 and a crank 84. The cam 81 operates the lever 47 for opening and closing the grippers 45, the cam 82 operates the tappet for reciprocating the grippers 45, the crank 84 operates the lever 48 for raising and lowering the transfer rack 24 and the cam 83 operates the levers 51 for moving the rails 36 inwardly and outwardly.

The movable stop may be constituted by a spring loaded stop of the kind described later with reference to FIGS. 9 and 10, by a long upstanding leaf spring pivoted at its lower end, or by a length of chain hanging down in advance of the leading biscuit as described in United States application No. 818,150/59. Alternatively, an air blast may be used to support the advancing biscuits instead of a stop.

Since the biscuits are subjected to no forward pressure during the upward movement of the transfer rack 24, the removal of the biscuits from the column is effected extremely gently and without damage to fragile biscuits. Any crumbs which may form are automatically discharged downwardly by the chute constituted by the web 50. The rack teeth 25 are capable of dealing with round, square or oblong biscuits and with biscuits having rounded, semi-rounded or square edges.

To adjust the apparatus to vary the number of biscuits in the withdrawn batches, the stop 20 is shifted along the transfer rack 24, the bottom position of the transfer rack is correspondingly adjusted to compensate for the change in level of the stop 20 and the stops 26 are shifted along the rails 36. The stop 20 is pivoted to a bracket 52 slidable along a rod 53 and has detents 54 for engaging the teeth on the rack. The detents 54 are held by a spring 65 in engagement with the selected teeth. The stops 26 have detents 55 for engaging teeth 56 on the rails 36, being held by springs 57 in engagement with the teeth.

It will be appreciated that the various elements of the apparatus are operated in properly timed relationship from suitable cams.

The construction shown in FIGS. 9 and 10 differs from that already described only in that the transfer rack 124 serves to meter the biscuits by length and not by count. It is accordingly illustrated diagrammatically in these figures. The transfer rack 124, as before, carries a stop 20 for arresting the column of biscuits but it has only three rack teeth 125 at its extreme rear edge, the remainder of its upper surface 60 being flat. It accordingly lifts a batch of biscuits determined as to length by the length of the surface 60 plus three biscuits at the extreme rear of the batch which alone are shunted rearwardly and so re-pitched by the teeth 125 of the ascending rack. As before the grippers 45 draw the biscuits rearwardly to establish a gap in the column to enable the biscuits numbered 4–6 to repitch as the rack rises and the toe 23 of the rack to act as a separator to establish a clean and positive break between the biscuits numbered 3 and 4 as shown in FIG. 10. The lifted batch of biscuits is deposited on rails as the rack descends as in the case of the construction previously described.

As the biscuits advance towards the stop 20 they are supported by a movable support 61 positioned between the limbs of the rack 124 and urged to the left by a spring 62. As shown in FIG. 10, the spring returns the support 61, when the rack rises, to position to support the biscuits succeeding the lifted batch.

Preferably, whether the transfer rack be organised for metering by length, as in FIGS. 9 and 10, or by count, as in FIGS. 2–7, its rearmost tooth 225 has, as indicated in FIG. 11, a greater pitch than the other teeth. This causes the rearmost biscuit 300 of the lifted batch to assume a greater angle to the vertical than the other biscuits, thereby enabling it to act as a prop to prevent the lifted batch from tilting backwards, to provide a squaring up effect if blisters on the biscuits tend to skew the pack and to provide a more definite break-away of the rearmost biscuit from its successor, so preventing in the most effective manner any interlocking of the biscuits at the point of separation of the batch.

As indicated in FIG. 9 the machine may be provided both with a rack 124 metering by length and a rack 24 metering by count which racks can be selectively coupled at will to the rack reciprocating mechanism.

Alternatively, the length metering rack may be removable from the machine and replaceable by a count metering rack and vice versa.

What we claim as our invention and desire to secure by Letters Patent is:

1. Apparatus for handling biscuits comprising a supporting surface, means for advancing along said supporting surface to a transfer station a column of biscuits standing on edge, a reciprocating transfer device at the transfer station for removing metered batches of biscuits in succession from the head of said column, means for imparting alternate withdrawal and return strokes to said transfer device, said transfer device having rack teeth for carrying at least the rearmost biscuits of each batch, said rack teeth having a pitch greater than the pitch of the biscuits in the column and shunting the engaged biscuits rearwardly to increase their pitch as the batch of biscuits is removed from the column, means for removing each withdrawn batch of biscuits from the transfer device during its return stroke, grippers for gripping biscuits in the column situated in rear of the biscuits at the transfer station and means operating in timed relationship with said transfer device for actuating said grippers to engage said biscuits and move them bodily rearwards prior to each withdrawal stroke of the transfer device.

2. Apparatus for handling biscuits comprising a supporting surface, means for advancing along said supporting surface to a transfer station a column of biscuits standing on edge, a reciprocating transfer rack at the transfer station for lifting metered batches of biscuits in succession from the head of said column, means for imparting alternate lifting and return strokes to said transfer rack, said transfer rack having rack teeth for engaging at least the rearmost biscuits of each batch, said rack teeth having a pitch greater than the pitch of the biscuits in the column and shunting the engaged biscuits rearwardly to increase their pitch as the batch of biscuits is lifted from the column, means for removing each lifted batch of biscuits from the transfer rack during its return stroke, grippers for gripping biscuits in the column situated in rear of the biscuits at the transfer station and means operating in timed relationship with said transfer rack for actuating said grippers to engage said biscuits and move then bodily rearwards prior to each lifting stroke of the transfer rack.

3. Apparatus according to claim 2 for batching the biscuits by count and in which the transfer rack has rack teeth for engaging and repitching all the biscuits in the batch.

4. Apparatus according to claim 3, in which the rack tooth for engaging the rearmost biscuit of the batch has a greater pitch than the other rack teeth so that the rearmost biscuit is inclined at a greater angle to the vertical than the other biscuits and so acts as a prop for the other biscuits.

5. Apparatus according to claim 2 for batching the biscuits by length and in which the transfer rack has rack teeth for engaging and repitching a few biscuits only at the rear of the batch.

6. Apparatus according to claim 5, in which the rack tooth for engaging the rearmost biscuit of the batch has a greater pitch than the other rack teeth so that the rearmost biscuit is inclined at a greater angle to the vertical than the other biscuits and so acts as a prop for the other biscuits.

7. Apparatus according to claim 2, in which the removing means comprises a movable support for receiving the batches of biscuits from the transfer rack as it performs its return stroke, means for moving said support into and out of receiving position in timed relationship with the movement of the transfer rack, and means for removing the batches of biscuits in succession from said support.

8. Apparatus according to claim 7, in which said support is constituted by a pair of rails located on opposite sides of the transfer rack and movable into and out of position to support the undersurfaces of the batches of biscuits.

9. Apparatus according to claim 7, in which said support carries a stop which is effective, when said support is in position to support a batch of biscuits, to support the succeeding biscuits in the column.

10. Apparatus according to claim 2, wherein said transfer rack has a surface constituting a separator for separating each batch of biscuits from the following biscuits as the batch is lifted from the column.

11. Apparatus according to claim 2, in which the transfer rack carries a stop for periodically arresting the advancing column of biscuits.

12. Apparatus according to claim 11, which includes a spring loaded arm for supporting the leading biscuit of the column as the column advances to the stop on the transfer rack.

References Cited in the file of this patent

UNITED STATES PATENTS

| | | |
|---|---|---|
| 680,359 | Rist | Aug. 13, 1901 |
| 1,916,974 | Fuller et al. | July 4, 1933 |
| 2,565,275 | Snowfield | Aug. 21, 1951 |
| 2,701,633 | Russell | Feb. 8, 1955 |
| 2,705,584 | Gilbert et al. | Apr. 5, 1955 |
| 2,954,881 | Hopton et al. | Oct. 4, 1960 |